United States Patent
Johansen et al.

[11] Patent Number: 6,055,481
[45] Date of Patent: Apr. 25, 2000

[54] REPRESENTATION OF SEISMIC DATA

[76] Inventors: Svein E. Johansen, N-0385, Oslo; Ola Kristian Fjeld, N-7020, Trondheim, both of Norway

[21] Appl. No.: 09/068,791
[22] PCT Filed: Nov. 22, 1996
[86] PCT No.: PCT/NO96/00276
  § 371 Date: May 19, 1998
  § 102(e) Date: May 19, 1998
[87] PCT Pub. No.: WO97/20234
  PCT Pub. Date: Jun. 5, 1997

[30] Foreign Application Priority Data

Nov. 28, 1995 [NO] Norway .................................. 954829

[51] Int. Cl.$^7$ ................................................ G06F 19/00
[52] U.S. Cl. .................................................. 702/14
[58] Field of Search .......................... 702/14–18; 367/7, 367/9, 910; 181/108, 111, 112

[56] References Cited

U.S. PATENT DOCUMENTS 3,631,384 12/1971 Smith .
3,887,896 6/1975 Ramstedt ................................ 367/910
4,686,475 8/1987 Kober et al. ........................... 324/349
4,849,947 7/1989 Baule et al. ........................... 181/112

FOREIGN PATENT DOCUMENTS 0247813 12/1987 European Pat. Off. .
2553522 4/1985 France .

OTHER PUBLICATIONS

Internet Discussion Nov. 15, 1995 Seismic records— listening to them.
Internet Discussion Nov. 16, 1995 Seismic records— listening to them.
Internet Discussion Nov. 20, 1995 Seismic records— listening to them.

Primary Examiner—Donald E. McElheny, Jr.
Attorney, Agent, or Firm—Rothwell, Figg, Ernst & Kurz

[57] ABSTRACT

A method for the representation of seismic data for interpretation by an operator in relation to the reproduction of geological formations, the seismic data are collected by one or more sensors and are converted to seismic electrical and/or optical signals. A chosen part of the seismic signal is converted into acoustic signals within the perceptive frequency range of 20–20,000 Hz.

3 Claims, 1 Drawing Sheet

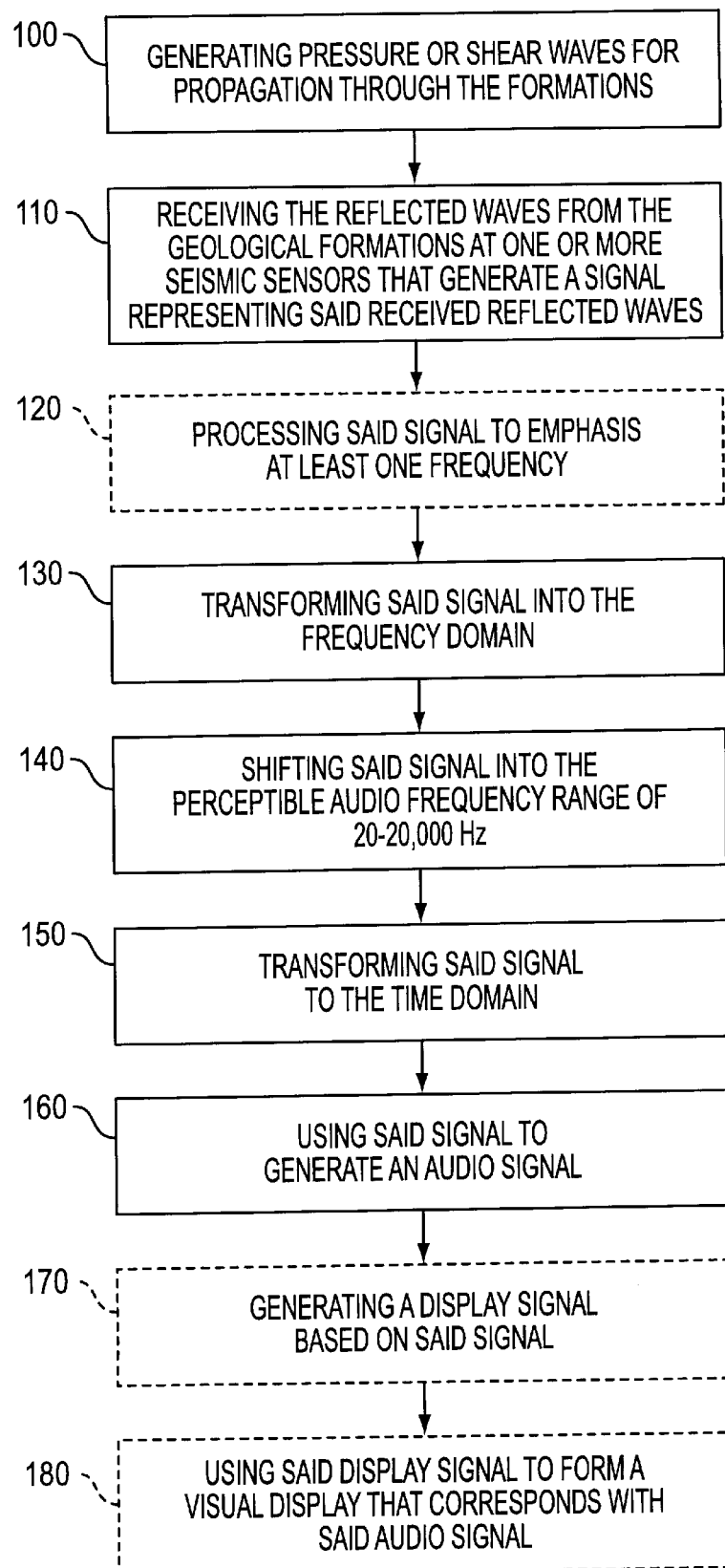

REPRESENTATION OF SEISMIC DATA

BACKGROUND OF THE INVENTION

This invention relates to a method for the representation of seismic information.

BACKGROUND AND RELATED ART

In seismic studies large amounts of information is generated by emitting pressure and/or shear waves into the geologic formations. In step 100 these waves are reflected from different layers and formations and may again be measured by suitable instruments. In step 100 emitters and sensors may be positioned in the water covering the geological formations to be studied, e.g. in studies at sea, by the surface or in bore holes, for example. Depending on the complexity of the different fenomena in the studied formations, such as multiple reflections between different strata, the signals may be very complicated. Large computers are used to assemble different measurements in the same area in order to ease the interpretation of the signals, but the final interpretation is performed by visual inspection by an operator in order to recognize formations which for example may indicate oil or gas deposits. The visual control is performed using graphic pictures made on the basis of the seismic data. These pictures may, even after predictable disturbances have been removed from the signal by use of a computer, be very complicated and difficult to follow, making the interpretation difficult and uncertain. The interpretation is to a large extent based upon the ability of the interpreter to recognize and see analogies to pictures and patterns from his experience as a seismic interpreter, even if they are distorted or partly hidden by noise. The costs related to making mistakes in these fields may be very large, both if an oil field is not found, or if the drilling is is performed in the wrong area. Thus much may be gained by making the interpretation easier.

SUMMARY OF THE INVENTION

The present invention provides an other method for tranformation of the seismic signal to be interpreted by an operator. The method according to the invention may be used in addition to or in combination with the visual display of the signals.

Thus the present invention relates to a method for the representation of seismic data. In this method, the seismic data are collected by one or more sensors and are converted to seismic electrical and/or optical signals. A chosen part of the seismic signal is converted into acoustic signals within the perceptive frequency range of 20–20,000 Hz.;

BRIEF DESCRIPTION OF THE DRAWING

FIG. 1 is a flow diagram of a method for representation of seismic data in accordance with an embodiment of the present invention.

DETAILED DESCRIPTION OF THE INVENTION

The invention is illustrated in FIG. 1, is based on the fact that the human ear is, with som practice, able to distinguish between very small variations in amplitude, phase and frequency that the eye can not perceive in a visual display of the signal. In using stereo-effects this will be amplified as small differences in phase will change the "position" of a virtual sound source in relation to one or more loudspeakers or headphones. A trained ear will in addition be able to perceive a plurality of simultaneous frequencies, and hear an information signal even if it is hidden in noise. The present invention will therefore make it possible to discover smaller variations and details in the seismic signal, and therefore be a valuable supplement to the present visual interpretation.

The present invention starts with the generation of pressure or shear waves for propagation through geological formations, step 100. Then, in step 110, the reflected waves from the geological formations are received at one or more seismic sensors that generate a signal representing the received reflected waves. Implementation of the steps 100 and 100 are well-known processes and are described above.

Preferrably a seismic signal is treated in one or more known computer programs for the removal of noise and similar in seismic studies, and which are in the form being used in the visual interpretation of the signals. The signal may be treated further in order to provide a signal in the hearing range, and which is adjusted in duration to optimize tha listening of the ear.

The present invention will be described below with the use of concrete examples to ease the understanding of the invention.

The seismic data are processed in the usual way for visual representation of the processed data from seismic sections or "3-D cubes", on a screen. This is done using conventional software on a PC or other, for example UNIX-based, computers. The computer is also in the usual way provided with a display and a keyboard, and preferrably also with a mouse.

When interpreting the seismic signals an operator may choose a part of the signal to be converted into acoustic signal. When using available computer systems a part of a displayed picture on a computer may for example be marked in relation to a visual interpretation, so that the marked part of the signal is converted and played as sound at the same time as one can see the original visually presented on a computer display. The operator can choose an interesting part of the seismic signal displayed on the screen, for example by marking an area of the displayed picture. This function may be controlled by keyboard or can be carried out using a computer mouse or similar equipment. Thus the operator can choose to listen to signals representing certain geological reflections/horizons to detect variations being difficult to discover visually.

When the interesting part of the displayed seismic signal is chosen it is treated by suitable software to provide a tranformed signal representing the chosen seismic signal, and being within a perceptive frequency range. Many different algorithms exist being capable of converting a low frequency signal into a higher frequency range, and may for example comprise Fourier analysis or similar. Reflections from a geological horizon is frequency analysed and tranformed into a perceptible range. Different tones and chords wil thus represent different frequencies and combinations of these. The hearing may provide a quatitative impression of the frequency content of the signal.

One way to achieve this is to tranform the signal into the frequency plane, in step 130. This signal comprises a plurality of frequency components which may be shifted and treated so as to provide a signal with a frequency specter within the perceptable range, in step 140. The signal is then tranformed back into the time plane and may be played with ordinary sound equipment, in steps 150 and 160.

In the generation of the sound signal a sound card may be used in the computer using a so called "MIDI interface". The MIDI format is a standardized signal protocol for sound signals much used in relation to electronic instruments. Thus the transformed signal may be played using commercially available music equipment. In using the MIDI format one may also treat the signal further with available equipment for sound processing to emphasize especially interesting frequencies or phenomena as in optional step 120, e.g. to divide the signal into a multitude of different channels. The transformed signal can then be played on one or more loudspeakers, depending on the wanted spacial effects, or with earphones.

While playing the sound signal the corresponding position in the visual display of the seismic signal may be indicated, in steps 170 and 180. This way the operator may combine the acoustic and the visual means in an effective, audio-visual way.

The abovementioned method may be utilized on information collected in traditional seismic studies in which one detects waves being reflected from geological formations, and also information being collected with tomographic methods, for example comprising waves propagating between boreholes. The method may be used on traditional pressure waves (P-waves), but may also be extended to interpretation of shear waves in three components, derived parametre data og other wave types. The different types of seismic signals contain different types of information and the present invention provides good possibililties for treating these signals in different ways. This provides therefore a flexible system being readily adapted to different situations. For example the three components in the shear wave data may be use to create a three dimensional reproduction.

What is claimed is:

1. A method for the representation of seismic data for interpretation by an operator in relation to the reproduction of geological formations, comprising the steps of:

generating pressure or shear waves; for propagation through the formations;

receiving the reflected waves from the geological formations at one or more seismic sensors that generate a signal representing said received reflected waves;

transforming said signal into the frequency domain;

shifting said signal into the perceptible audio frequency range of 20–20,000 Hz;

transforming said signal to the time domain; and using said signal to generate an audio signal.

2. The method of claim 1 further comprising the steps of:

generating a display signal based on said signal; and using said display signal to form a visual display that corresponds with said audio signal.

3. The method of claim 1 further comprising the step of processing the signal to emphasis at least one frequency.

* * * * *